United States Patent

Hayashi

Patent Number: 5,532,879
Date of Patent: Jul. 2, 1996

[54] MICROSCOPE OBJECTIVE LENS

[75] Inventor: Itoe Hayashi, Yokohama, Japan

[73] Assignee: Nikon Corporation, Tokyo, Japan

[21] Appl. No.: 275,416

[22] Filed: Jul. 15, 1994

[30] Foreign Application Priority Data

Jul. 23, 1993 [JP] Japan .................. 5-202783

[51] Int. Cl.$^6$ .............. G02B 21/02; G02B 9/34; G02B 9/14
[52] U.S. Cl. .......... 359/661; 359/660; 359/774; 359/785
[58] Field of Search ............. 359/660, 774, 359/785, 661

[56] References Cited

U.S. PATENT DOCUMENTS

| 3,428,390 | 2/1969 | Rosenberger | 359/660 |
| 3,537,773 | 11/1970 | Klein | 359/660 |
| 4,166,674 | 9/1979 | Tojyo | 359/660 |

Primary Examiner—Scott J. Sugarman
Attorney, Agent, or Firm—Shapiro and Shapiro

[57] ABSTRACT

A microscope objective lens, sequentially from an object-side, comprises a first lens group constructed of a positive lens element, a second lens group constructed of a negative lens element, and a third lens group constructed of cemented lens elements consisting of a negative lens element and a positive lens element and exhibiting a positive refracting power on the whole. Further, the microscope objective lens system satisfies the following conditions:

$1.5 < f/f_1 < 1.9$ $-3.8 < f/f_2 < 3.1$ $2.0 < f/f_3 < 2.7$ $0.9 < (d_2+d_3+d_4+d_5)/f_1 < 1.2$ $15 < n_1 \cdot f/d_1$ $50 < n_2 \cdot f/d_3$ where
  f : the focal length of the whole system,
  $f_1$: the focal length of the first lens group,
  $f_2$: the focal length of the second lens group,
  $f_3$: the focal length of the third lens group,
  $d_1$: the central thickness of the positive lens element in the first lens group,
  $d_2$: the on-axis spatial interval between the first lens group and the second lens group,
  $d_3$: the central thickness of the negative lens element in the second lens group,
  $d_4$: the on-axis spatial interval between the second lens group and the third lens group,
  $d_5$: the central thickness of the negative lens element constituting the cemented lens element in the third lens group,
  $n_1$: the refractive index of the positive lens element in the first lens group, and
  $n_2$: the refractive index of the negative lens element in the second lens group.

7 Claims, 2 Drawing Sheets

MICROSCOPE OBJECTIVE LENS

BACKGROUND OF THE INVENTION

1. Field of the Invention

The present invention generally relates to a microscope objective lens and, more particularly, to a Triplet type of low-powered microscope objective lens having a long working distance.

2. Related Background Art

A typical low-powered microscope objective lens of the prior art may be a commercially available 4-powered phase-difference-oriented Plan Achromat offered by the present applicant. This microscope objective lens has a so-called 4-group/4-lens-element construction in which the objective lens is constructed of four lens groups each consisting of a single lens element.

The conventional low-powered Plan objective lens presents, however, such a drawback that a curvature of field is easy to occur when increasing a working distance (a distance along an optical axis between an observed object and a closest-to-object lens surface). In other words, the drawback is that the working distance can not be secured long for keeping well a flatness of the image surface.

SUMMARY OF THE INVENTION

It is an object of the present invention, which has been devised in view of the problems given above, to provide a low-powered microscope objective lens exhibiting a good flatness of an image surface where a variety of aberrations are well corrected and having a sufficiently long working distance.

To accomplish the above object, a microscope objective lens according to one aspect of the present invention, sequentially from an object-side, comprises: a first lens group constructed of a positive lens element; a second lens group constructed of a negative lens element; and a third lens group constructed of cemented lens elements consisting of a negative lens element and a positive lens element and exhibiting a positive refracting power on the whole.

Herein, the above microscope objective lens system satisfies the following conditions:

$1.5 < f/f_1 < 1.9$ $-3.8 < f/f_2 < 3.1$ $2.0 < f/f_3 < 2.7$ $0.9 < (d_2+d_3+d_4+d_5)/f_1 < 1.2$ $15 < n_1 \cdot f/d_1$ $50 < n_2 \cdot f/d_3$ where f : the focal length of the whole system, $f_1$: the focal length of the first lens group, $f_2$: the focal length of the second lens group, $f_3$: the focal length of the third lens group, $d_1$: the central thickness of the positive lens element in the first lens group, $d_2$: the on-axis spatial interval between the first lens group and the second lens group, $d_3$: the central thickness of the negative lens element in the second lens group, $d_4$: the on-axis spatial interval between the second lens group and the third lens group, $d_5$: the central thickness of the negative lens element constituting the cemented lens element in the third lens group, $n_1$: the refractive index of the positive lens element in the first lens group, and $n_2$: the refractive index of the negative lens element in the second lens group.

Further, to accomplish the above object, a microscope objective lens according to another aspect of the present invention, sequentially from the object-side, comprises: a first lens group having a positive lens element; a second lens group having a negative lens element; and a third lens group constructed of cemented lens elements consisting of a negative lens element and a positive lens element and of a positive lens element and also exhibiting a positive refracting power on the whole.

To accomplish the above object, a microscope objective lens according to still another aspect of the present invention, sequentially from the object-side, comprises: a first lens group constructed of a positive lens element; a second lens group constructed of a negative lens element; and a third lens group constructed of cemented lens elements consisting of a negative lens element and a positive lens element and of a positive lens element and also exhibiting a positive refracting power on the whole.

Herein, a phase shifting film is provided between joined surfaces of the cemented lens elements in the third lens group.

The microscope objective lens system of the present invention is constructed as a Triplet type and is therefore capable of easily correcting a curvature-of-field caused when increasing the working distance. This correction involves increasing the refracting power of the negative lens element in the second lens group. That is, a flat image can be obtained by reducing a Petzval's sum.

Herein, in the microscope objective lens system according to this invention, it is desirable to satisfy the following condition:

$$1.5 < f/f_1 < 1.9 \qquad (1)$$

where f : the focal length of the whole microscope objective lens system, and $f_1$: the focal length of the first lens group.

The conditional expression (1) prescribes a proper value of the positive refracting power in the first lens group.

If under a lower limit value of the conditional expression (1), the following drawbacks arise. The refracting power of the first lens group becomes too weak, and, therefore, a spherical aberration is excessively corrected. At the same time, an inward comatic aberration becomes large. Whereas if above an upper limit value of the conditional expression (1), the following drawbacks are produced. The refracting power of the first lens group becomes too strong, and hence a distortion is excessively corrected. At the same time, the spherical aberration is brought into an extreme lack of correction.

Further, in the microscope objective lens system according to this invention, it is desirable to satisfy the following condition:

$$-3.8 < f/f_2 < -3.1 \qquad (2)$$

where f : the focal length of the whole microscope objective lens system, and $f_2$: the focal length of the second lens group.

The conditional expression (2) prescribes a proper value of the negative refracting power in the second lens group.

If under a lower limit value of the conditional expression (2), there arise the following drawbacks. The refracting power of the second lens group becomes too weak, and, therefore, the spherical aberration is hard to correct. Simultaneously, an outward comatic aberration augments, and it is therefore difficult to keep a good imaging performance. Whereas if above an upper limit value of the conditional expression (2), there are caused the following drawbacks. The refracting power of the second lens group becomes too strong. Accordingly, as in the case of exceeding the upper limit value of the conditional expression (1), it is difficult to correct well the distortion and the spherical aberration.

Then, in the microscope objective lens system according to this invention, it is desirable to satisfy the following conditional expression:

$$2.0 < f/f_3 < 2.7 \quad (3)$$

where f : the focal length of the whole microscope objective lens system, and $f_3$: the focal length of the third lens group.

The conditional expression (3) prescribes a proper range of the refracting power in the third lens group.

If under a lower limit of the conditional expression (3), the following drawbacks are induced. The refracting power of the third lens group becomes too weak. Hence, the spherical aberration is excessively corrected, and, at the same time, the distortion increases. It is therefore difficult to keep the good imaging performance. Whereas if above an upper limit value of the conditional expression (3), there arise the following drawbacks. The refracting power of the third lens group excessively enhances, and the inward comatic aberration is remarkably produced. It is therefore difficult to obtain the good imaging performance.

Moreover, according to the present invention, if the phase shifting film is provided between the joined surfaces of the cemented lens elements in the third lens group, it is desirable to satisfy the following conditional expression:

$$0.9 < (d_2+d_3+d_4+d_5)/f_1 < 1.2 \quad (4)$$

where $f_1$: the focal length of the first lens group, $d_2$: the on-axis spatial interval between the first lens group and the second lens group, $d_3$: the central thickness of the negative lens element in the second lens group, $d_4$: the on-axis spatial interval between the second lens group and the third lens group, and $d_5$: the central thickness of the negative lens element constituting the cemented lens element in the third lens group.

The conditional expression (4) prescribes a position of the phase shifting film. In other terms, there is prescribed the position of the phase shifting film formed between the joined surfaces of the cemented lens elements constituting the third lens group. Accordingly, if above an upper limit value of the conditional expression (4), and if under a lower limit value thereof, a drawback is caused, wherein the position of the phase shifting film, i.e., the position of the cemented surface, is off a position of the pupil of the objective lens.

Further, as discussed above, the microscope objective lens of the present invention is capable of easily correcting the curvature of field by enhancing the refracting power of the second lens group. Hence, almost no curvature of field occurs. The spherical aberration, however, increases. Then, according to this invention, it is desirable to satisfy the following conditional expressions (5) and (6):

$$15 < n_1 \cdot f/d_1 \quad (5)$$

$$50 < n_2 \cdot f/d_3 \quad (6)$$

where f : the focal length of the whole microscope objective lens system, $d_1$: the central thickness of the positive lens element in the first lens group, $d_3$: the central thickness of the negative lens element in the second lens group, $n_1$: the refractive index of the positive lens element of the first lens group, and $n_2$: the refractive index of the negative lens element of the second lens group.

The conditional expressions (5) and (6) given above prescribe the correction of the spherical aberration. Namely, if under lower limit values of the conditional expressions (5) and (6), there arises a drawback in which the spherical aberration is excessively corrected, resulting in an occurrence of the inward comatic aberration.

Then, according to this invention, it is preferable to satisfy the following conditional expressions (7) and (8):

$$2.0 < v_1/(v_1-v_2) \quad (7)$$

$$v_2/(v_2-v_1) < -1.0 \quad (8)$$

where $v_1$: the Abbe's number of the positive lens element of the first lens group, and $v_2$: the Abbe's number of the negative lens element of the second lens group.

The above conditional expressions (7) and (8) prescribe conditions of achromatism with respect to two colors. That is, if under a lower limit value of the conditional expression (7), and if above an upper limit of the conditional expression (8), this results in an unpreferable state where the achromatism for the two colors can not be attained.

Further, for the purpose of making an observation by vertical fluorescence possible, it is preferable to select a glass material exhibiting a high transmittance with respect to an ultraviolet ray (a ray in the vicinity of 340 nm) for use. It is required that the above glass material exhibiting the high transmittance be selected particularly for the positive lens element of the first lens group.

Moreover, for correcting the spherical aberration, it is preferable that a magnitude of a curvature of the lens surface be larger on the image-side than on the object-side of the closest-to-image-side positive lens element constituting the third lens group.

Note that the refractive index and the Abbe's number are values with respect to d-line ($\lambda$=587.6 nm) in each of the conditional expressions given above.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described with reference to the accompanying drawings.

(First Embodiment)

Figure 1:
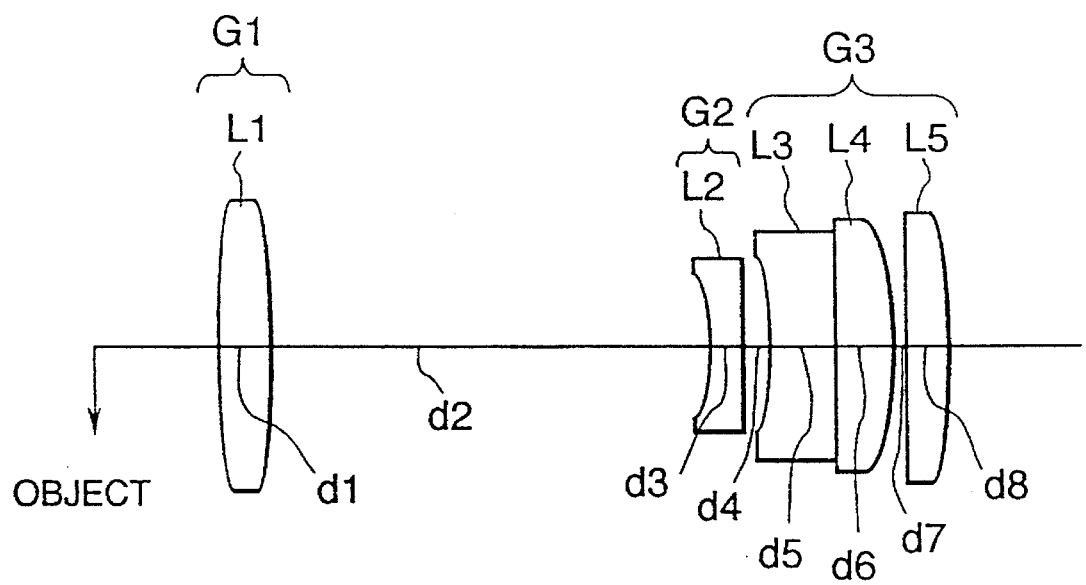
FIG. 1 is a view schematically illustrating a construction of a microscope objective lens system in accordance with a first embodiment of the present invention.

FIG. 1 is a view schematically illustrating a construction of a microscope objective lens system in a first embodiment of the present invention.

The illustrated objective lens system is, sequentially from an object-side, constructed of a first lens group $G_1$ composed of a biconvex lens element $L_1$, a second lens group $G_2$ composed of a negative meniscus lens element $L_2$ with its concave surface toward the object-side and a third lens group $G_3$ composed of cemented lens elements of a plano-concave lens element $L_3$ with its concave surface toward the object-side and a plano-convex lens element $L_4$ with its convex surface toward an image-side and of a biconvex lens element $L_5$.

As described above, the microscope objective lens system in this embodiment has a 3-group/5-lens-element construction.

The following Table 1 shows values of various items in the first embodiment. In the Table 1, the symbol f designates the focal length, N.A. represents the numerical aperture, B denotes the magnification, and W.D. represents the working distance. Further, the numerals at the left end indicate the order of the respective lens surfaces from the object-side, r designates the curvature of radius of each lens surface, d shows the interval between the lens surfaces, n indicates the refractive index with respect to the d-line ($\lambda$=587.6 nm), and v represents the Abbe's number with respect to the d-line ($\lambda$=587.6 nm).

TABLE 1 f = 1.0 mm
N.A. = 0.13
B = −4.0
W.D. = 0.40

|   | r      | d    | v    | n       |       |
|---|--------|------|------|---------|-------|
| 1 | 0.695  | 0.06 | 60.7 | 1.60311 | $L_1$ |
| 2 | −0.695 | 0.47 |      |         |       |
| 3 | −0.175 | 0.03 | 31.1 | 1.68893 | $L_2$ |
| 4 | −2.675 | 0.03 |      |         |       |
| 5 | −0.305 | 0.07 | 38.1 | 1.60342 | $L_3$ |
| 6 | ∞      | 0.06 | 60.7 | 1.60311 | $L_4$ |
| 7 | −0.259 | 0.01 |      |         |       |
| 8 | 3.721  | 0.05 | 53.9 | 1.71300 | $L_5$ |
| 9 | −0.489 |      |      |         |       |

(Condition Corresponding Values)

TABLE 1-continued (1) $f/f_1 = 1.709$
(2) $f/f_2 = -3.663$
(3) $f/f_3 = 2.597$
(4) $(d_2 + d_3 + d_4 + d_5)/f_1 = 1.017$
(5) $n_1 \cdot f/d_1 = 26.7$
(6) $n_2 \cdot f/d_3 = 54.5$
(7) $v_1/(v_1 - v_2) = 2.05$
(8) $v_2/(v_2 - v_1) = -1.05$ (Second Embodiment)

Figure 2:
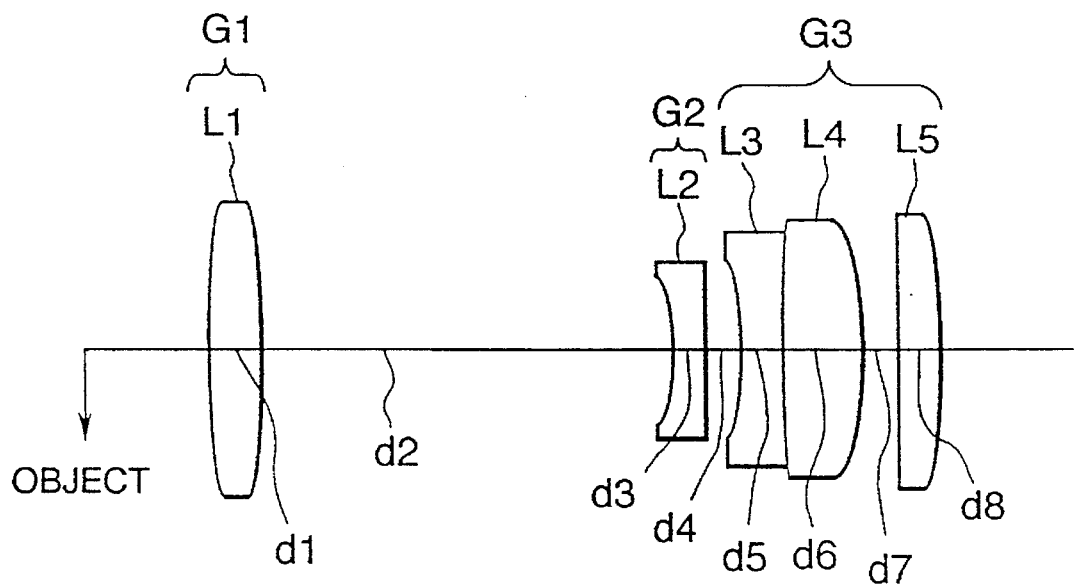
FIG. 2 is a view schematically illustrating a construction of the microscope objective lens system in accordance with a second embodiment of this invention.

FIG. 2 is a view schematically illustrating a construction of the microscope objective lens system in a second embodiment of the present invention.

The illustrated objective lens system is, sequentially from the object-side, constructed of the first lens group $G_1$ composed of the biconvex lens element $L_1$, the second lens group $G_2$ composed of the negative meniscus lens element $L_2$ with its concave surface toward the object-side and the third lens group $G_3$ composed of the cemented lens elements of a biconcave lens element $L_3$ and a biconvex lens element $L_4$ and of a biconvex lens element $L_5$.

As described above, the microscope objective lens system in the second embodiment is also based on the 3-group/5-lens-element construction and has basically the same configuration as the first embodiment. The microscope objective lens system is, however, different in such a point that the joined surfaces between the cemented lenses are not plane as well as in a refracting power and a configuration of each lens group.

The following Table 2 shows values of various items in the second embodiment. In the Table 2, the symbol f designates the focal length, N.A. represents the numerical aperture, B denotes the magnification, and W.D. represents the working distance. Further, the numerals at the left end indicate the order of the respective lens surfaces from the object-side, r designates the curvature of radius of each lens surface, d shows the interval between the lens surfaces, n indicates the refractive index with respect to the d-line ($\lambda$=587.6 nm), and v represents the Abbe's number with respect to the d-line ($\lambda$=587.6 nm).

TABLE 2 f = 1.0 mm
N.A. = 0.13
B = −4.0
W.D. = 0.43

|   | r      | d    | v    | n       |       |
|---|--------|------|------|---------|-------|
| 1 | 0.575  | 0.05 | 60.7 | 1.60311 | $L_1$ |
| 2 | −1.039 | 0.45 |      |         |       |
| 3 | −0.182 | 0.03 | 38.1 | 1.60342 | $L_2$ |
| 4 | −2.334 | 0.04 |      |         |       |
| 5 | −0.366 | 0.04 | 36.3 | 1.62004 | $L_3$ |
| 6 | 0.922  | 0.09 | 60.7 | 1.60311 | $L_4$ |
| 7 | −0.273 | 0.03 |      |         |       |
| 8 | 2.245  | 0.05 | 57.0 | 1.62280 | $L_5$ |
| 9 | −0.588 |      |      |         |       |

(Condition Corresponding Values)

(1) $f/f_1 = 1.610$
(2) $f/f_2 = -3.040$
(3) $f/f_3 = 2.268$
(4) $(d_2 + d_3 + d_4 + d_5)/f_1 = 0.903$
(5) $n_1 \cdot f/d_1 = 20.0$
(6) $n_2 \cdot f/d_3 = 53.5$
(7) $v_1/(v_1 - v_2) = 2.68$
(8) $v_2/(v_2 - v_1) = -1.68$ (Third Embodiment)

Figure 3:
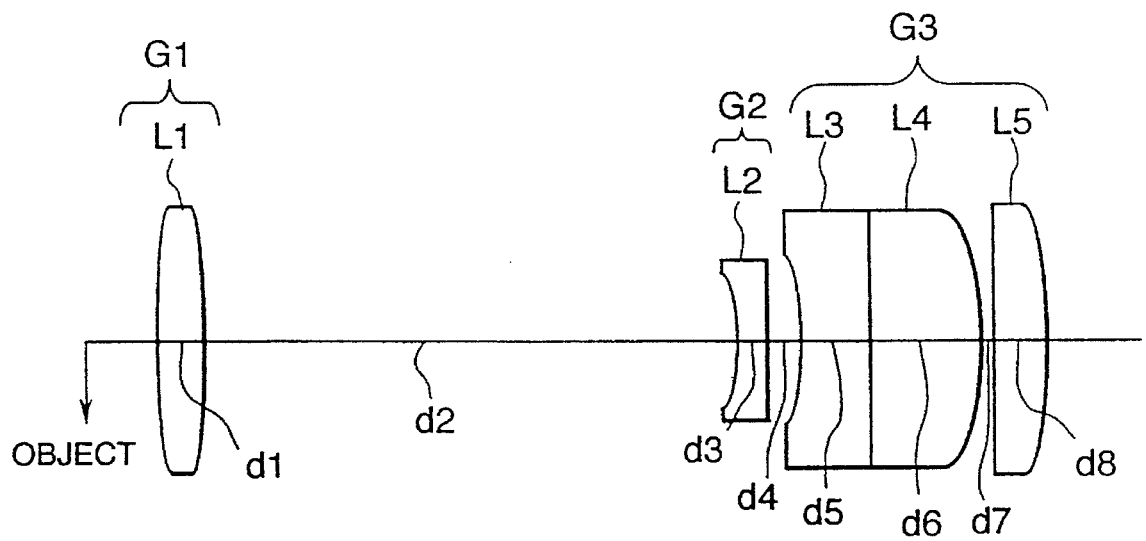
FIG. 3 is a view schematically illustrating a construction of a first objective lens of the microscope objective lens system in accordance with a third embodiment of this invention.
Figure 4:
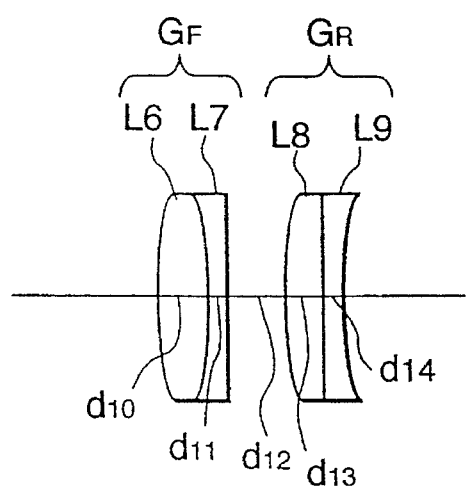
FIG. 4 is a view schematically illustrating a construction of a second objective lens of the microscope objective lens system in the third embodiment.

In accordance with a third embodiment of the present invention, the microscope objective lens system according to this invention is applied to a first objective lens of an infinity system. Herein, FIG. 3 is a view schematically illustrating a construction of the microscope objective lens system as the first objective lens in the third embodiment. FIG. 4 is a view schematically showing a construction of a lens system as a second objective lens in the third embodiment. Note that the infinity system is defined as an optical system including, sequentially from a sample-surface-side, the first objective lens and the second objective lens, whereby beams of light between the first and second objective lenses are collimated into substantially parallel beams of light.

Referring to FIG. 3, the microscope objective lens system as the first objective lens is, sequentially from the object-side, constructed of the first lens group $G_1$ composed of the biconvex lens element $L_1$, the second lens group $G_2$ composed of the negative meniscus lens element $L_2$ with its concave surface toward the object-side and the third lens group $G_3$ composed of the cemented lens elements of the plano-concave lens element $L_3$ and the plano-convex lens element $L_4$ and of the biconvex lens element $L_5$.

Further, the second objective lens shown in FIG. 4, comprises, sequentially from the first objective lens side, a front group $G_F$ constructed of cemented lens elements of a biconvex lens element $L_6$ and a biconcave lens element $L_7$ and exhibiting a positive refracting power on the whole and a rear group $G_R$ constructed of a plano-convex lens element $L_8$ and a plano-concave lens element $L_9$ and exhibiting a negative refracting power on the whole.

As described above, the first objective lens of the microscope objective lens system in third embodiment is also based on the 3-group/5-lens-element construction and has basically the same configuration as the first embodiment.

The following Table 3 shows values of various items in the third embodiment. In the Table 3, the symbol f designates the focal length, N.A. represents the numerical aperture, B denotes the magnification, and W.D. represents the working distance. Further, the numerals at the left end indicate the order of the respective lens surfaces from the object-side, r designates the curvature of radius of each lens surface, d shows the interval between the lens surfaces, n indicates the refractive index with respect to the d-line ($\lambda$=587.6 nm), and v represents the Abbe's number with respect to the d-line ($\lambda$=587.6 nm).

TABLE 3 f = 1.6 mm
N.A. = 0.13
B = -4.0
W.D. = 0.40

|  | r | d | v | n |  |
| --- | --- | --- | --- | --- | --- |
| 1 | 0.460 | 0.05 | 60.7 | 1.56384 | $L_1$ |
| 2 | -0.871 | 0.46 |  |  |  |
| 3 | -0.157 | 0.03 | 31.1 | 1.68893 | $L_2$ |
| 4 | -0.840 | 0.03 |  |  |  |
| 5 | -0.268 | 0.06 | 38.1 | 1.60342 | $L_3$ |
| 6 | ∞ | 0.10 | 60.7 | 1.60311 | $L_4$ |
| 7 | -0.243 | 0.004 |  |  |  |
| 8 | 5.997 | 0.05 | 50.2 | 1.72000 | $L_5$ |
| 9 | -0.746 | 2.00 |  |  |  |
| 10 | 1.030 | 0.13 | 54.0 | 1.61720 | $L_6$ |
| 11 | -1.742 | 0.04 | 35.2 | 1.74950 | $L_7$ |
| 12 | 6.970 | 0.16 |  |  |  |
| 13 | 0.982 | 0.10 | 42.0 | 1.66755 | $L_8$ |

TABLE 3-continued

| 14 | ∞ | 0.05 | 44.4 | 1.61266 | $L_9$ |
| --- | --- | --- | --- | --- | --- |
| 15 | 0.622 |  |  |  |  |

(Condition Corresponding Values)

(1) $f/f_1 = 1.848$
(2) $f/f_2 = -3.508$
(3) $f/f_3 = 2.085$
(4) $(d_2 + d_3 + d_4 + d_5)/f_1 = 1.072$
(5) $n_1 \cdot f/d_1 = 31.28$
(6) $n_2 \cdot f/d_3 = 56.30$
(7) $v_1/(v_1 - v_2) = 2.053$
(8) $v_2/(v_2 - v_1) = -1.049$ In accordance with each of the embodiments discussed above, it is possible to actualize the microscope objective lens capable of correcting well a variety of aberrations, exhibiting a high flatness of the image surface and having a sufficiently long working distance.

It is apparent that, in this invention, a wide range of different working modes can be formed based on the invention without deviating from the spirit and scope of the invention. This invention is not restricted by its specific working modes except being limited by the appended claims.

What is claimed is:

1. A microscope objective lens, sequentially from an object-side, comprising:

a first lens group constructed of a positive lens element;

a second lens group constructed of a negative lens element; and a third lens group constructed of cemented lens elements consisting of a negative lens element and a positive lens element and exhibiting a positive refracting power on the whole, wherein said microscope objective lens system satisfies the following conditions:

$1.5 < f/f_1 < 1.9$ $-3.8 < f/f_2 < -3.1$ $2.0 < f/f_3 < 2.7$ $0.9 < (d_2+d_3+d_4+d_5)/f_1 < 1.2$ $15 < n_1 \cdot f/d_1$ $50 < n_2 \cdot f/d_3$ where f : the focal length of the whole system, $f_1$: the focal length of said first lens group, $f_2$: the focal length of said second lens group, $f_3$: the focal length of said third lens group, $d_1$: the central thickness of said positive lens element in said first lens group, $d_2$: the on-axis spatial interval between said first lens group and said second lens group, $d_3$: the central thickness of said negative lens element in said second lens group, $d_4$: the on-axis spatial interval between said second lens group and said third lens group, $d_5$: the central thickness of said negative lens element constituting said cemented lens element in said third lens group, $n_1$: the refractive index of said positive lens element in said first lens group, and $n_2$: the refractive index of said negative lens element in said second lens group.

2. The microscope objective lens system according to claim 1, further satisfying the following conditions:

$$2.0 < v_2/(v_2-v_2)$$

$$v_2/(v_2-v_1) < -1.0$$

where $v_1$: the Abbe's number of said positive lens element of said first lens group, and $v_2$: the Abbe's number of said negative lens element of said second lens group.

3. The microscope objective lens system according to claim 1, wherein a phase shifting film is provided between joined surfaces of said cemented lens elements in said third lens group.

4. A microscope objective lens element, sequentially from an object-side, comprising:

a first lens group having a positive lens element;

a second lens group having a negative lens element; and a third lens group constructed of cemented lens elements having a negative lens element and a positive lens element and of a positive lens element and also exhibiting a positive refracting power on the whole;

wherein said microscope objective lens element satisfies the following conditions:

$$1.5 < f/f_1 < 1.9$$

$$-3.8 < f/f_2 < -3.1$$

$$2.0 < f/f_3 < 2.7$$

where f: the focal length of said whole microscope objective lens system, $f_1$: the focal length of said first lens group, $f_2$: the focal length of said second lens group, and $f_3$: the focal length of said third lens group.

5. The microscope objective lens system according to claim 4, further satisfying the following condition:

$$0.9 < (d_2+d_3+d_4+d_5)/f_1 < 1.2$$

where $f_1$: the focal length of said first lens group, $d_1$: the central thickness of said positive lens element in said first lens group, $d_2$: the on-axis spatial interval between said first lens group and said second lens group, $d_3$: the central thickness of said negative lens element in said second lens group, $d_4$: the on-axis spatial interval between said second lens group and said third lens group, and $d_5$: the central thickness of said negative lens element constituting said cemented lens element in said third lens group.

6. The microscope objective lens system according to claim 4, further satisfying the following conditions:

$$15 < n_1 \cdot f/d_1$$

$$50 < n_2 \cdot f/d_3$$

where f: the focal length of said whole microscope objective lens system, $d_1$: the central thickness of said positive lens element in said first lens group, $d_3$: the central thickness of said negative lens element in said second lens group, $n_1$: the refractive index of said positive lens element of said first lens group, and $n_2$: the refractive index of said negative lens element of said second lens group.

7. A microscope objective lens, sequentially from an object-side, comprising:

a first lens group constructed of a positive lens element;

a second lens group constructed of a negative lens element; and a third lens group constructed of cemented lens elements having a negative lens element and a positive lens element and of a positive lens element and also exhibiting a positive refracting power on the whole, wherein a phase shifting film is provided between joined surfaces of said cemented lens elements in said third lens group;

wherein said microscope objective lens satisfies the following condition:

$$0.9 < (d_2+d_3+d_4+d_5)/f_1 < 1.2$$

where $f_1$: the focal length of said first lens group, $d_2$: the on-axis spatial interval between said first lens group and said second lens group, $d_3$: the central thickness of said negative lens element in said second lens group, $d_4$: the on-axis spatial interval between said second lens group and said third lens group, and $d_5$: the central thickness of said negative lens element constituting said cemented lens element in said third lens group.

* * * * *